UNITED STATES PATENT OFFICE.

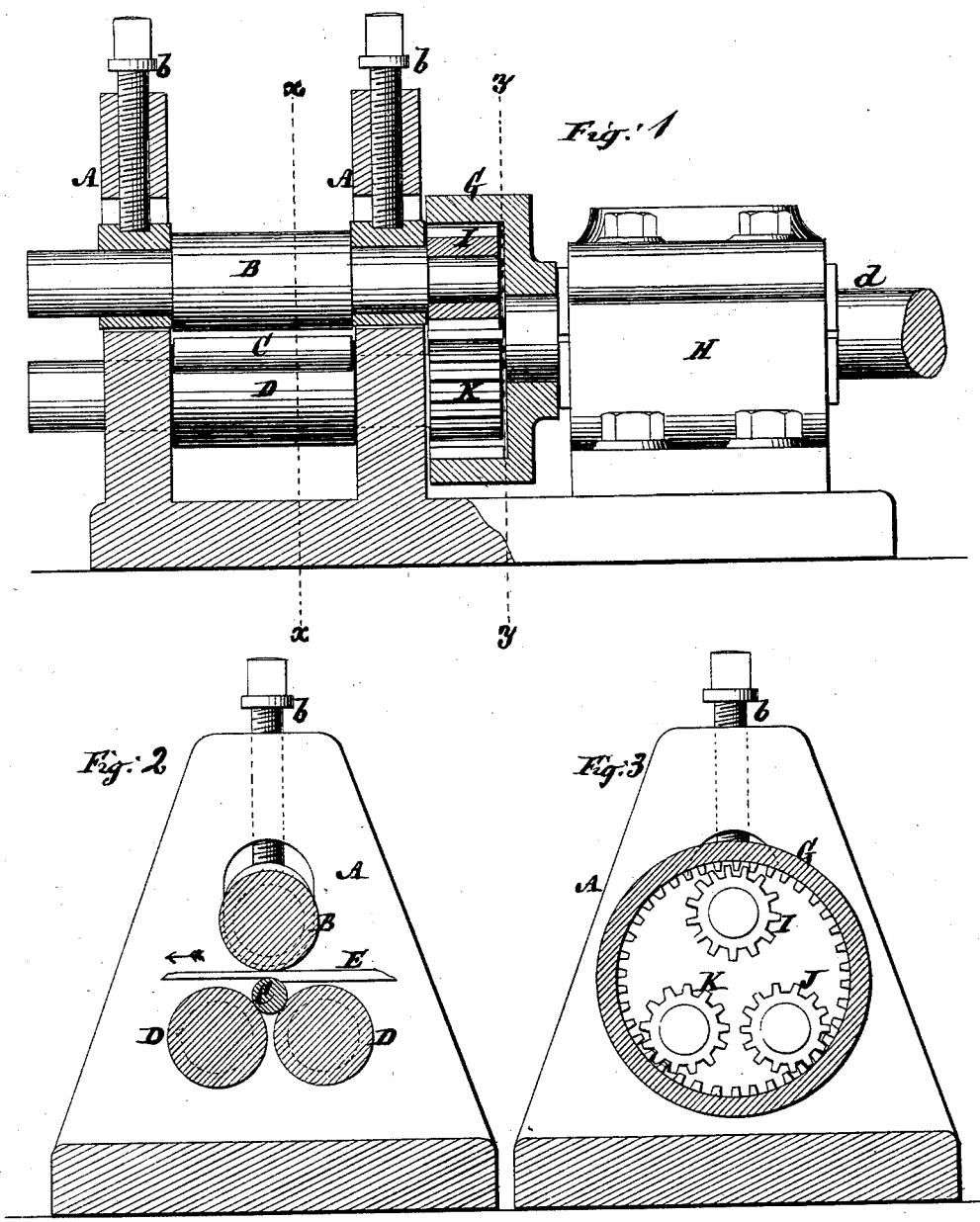

SAMUEL R. WILMOT, OF BRIDGEPORT, CONNECTICUT, ASSIGNOR TO THE AMERICAN BELT-TIN AND TUBE COMPANY, OF SAME PLACE.

IMPROVEMENT IN ROLLING-MILLS.

Specification forming part of Letters Patent No. 222,973, dated December 23, 1879; application filed September 14, 1877.

*To all whom it may concern:*

Be it known that I, SAMUEL R. WILMOT, of Bridgeport, in the county of Fairfield and State of Connecticut, have invented a new and useful Improvement in Rolling-Mills, of which the following is a description, reference being had to the accompanying drawings.

This invention relates to that class of rolling-mills in which either of two working-rolls working together is of small diameter, and is supported and braced laterally by and between the supporting and driving rolls. In such mills, as heretofore constructed, the small working-roll has had journals or necks which have been fitted to bearings or guides in the housings or framing of the mill. These journals or necks and their bearings or guides have not only been apt to form impediments or restraints to the self-adjustment of the said roll to its proper bearing between its supporting-rolls, but have prevented that facility for the removal, replacement, and substitution or renewal of the small roll which I have found in practice to be very desirable.

My improvement consists in the substitution for such small roll, with journals or necks and bearings or guides, of a small roll lying loosely on or against and without other support than the supporting-rolls, whereby I obtain a more effective operation and greater facility for repair.

Figure 1 represents a vertical section, parallel with its rolls, of a rolling-mill with my improvement. Fig. 2 is a transverse section of the same on the line $x\ x$. Fig. 3 is a transverse section thereof on the line $y\ y$.

A A are the housings of the mill, containing bearings for the journals of the parallel supporting-rolls D D and of the large work-roll B, which may be called the "anvil-roll," and the bearings of which are adjustable by means of set-screws $b\ b$.

C is the small work-roll, which may be, as represented in Fig. 6, a simple cylinder without journals, and which lies in the cleft or trough-like space between the two supporting-rolls without other support, and therefore does not require either to be any longer than the working-surface of the roll B, or to extend beyond the inner faces of the housings A A or of the journal-boxes of the other rollers.

The supporting-rolls D D and the anvil-roll B are all positively driven; but the small work-roll C, which I term the "peen-roll," is driven by the friction between its peripherical surface and the corresponding surfaces of the supporting-rolls D D.

The driving of the rolls B D D may be effected in various ways, but is shown in the drawings as effected by means of a cup-gear, G, on a driving-shaft, $d$, one of whose bearings, H, is also shown in Fig. 1, the said cup-gear gearing with a spur-gear, I, on the roll B, and with spur-gears J K on the supporting-rolls D D.

The roll C, lying loosely on and between the rolls D D, is, when the mill is in operation, free from and independent of all parts of the mill except the peripherical surfaces or faces of the latter rolls, so that it will always, without impediment or restraint, find its proper bearing on and between said faces, and be thereby uniformly supported along its whole length, and when it may be desirable, for any cause or purpose, to remove the said roll C, its easy removal is provided for by simply unscrewing the screws $b\ b$ sufficiently to permit the raising of the larger working-roll B high enough to permit the said roll C to pass out laterally over either of its supporting-rolls D D. This facility for removing the roll C, and the corresponding facility for its replacement or substitution, is of some importance, as it often becomes desirable in rolling-mills of this class to take out the small roll for regrinding its periphery, and in other mills the taking out and replacement of the roll involves considerable delay, which I am thus enabled to avoid.

I claim as my improvement—

The small working-roll C, lying loosely on or against and without other support than the supporting-rolls D, substituted for corresponding working-rolls found in other machines, that are supported by bearings in the housings, substantially as herein described.

S. R. WILMOT.

Witnesses:
BENJAMIN W. HOFFMAN,
FRED. HAYNES.